United States Patent
Livingston

(10) Patent No.: US 7,380,370 B2
(45) Date of Patent: Jun. 3, 2008

(54) REPELLING RODENTS

(75) Inventor: Annette Livingston, Sicklerville, NJ (US)

(73) Assignee: Armex, LLC, Sicklerville, NJ (US)

( * ) Notice: Subject to any disclaimer, the term of this patent is extended or adjusted under 35 U.S.C. 154(b) by 148 days.

(21) Appl. No.: 11/022,359

(22) Filed: Dec. 22, 2004

(65) Prior Publication Data

US 2006/0130391 A1    Jun. 22, 2006

(51) Int. Cl.
*A01M 13/00*    (2006.01)

(52) U.S. Cl. ............... 43/124; 43/129; 239/47; 239/55; 239/57; 239/58

(58) Field of Classification Search ............ 43/124, 43/125, 129, 131, 132.1, 1; 119/161; 239/34, 239/44, 47, 51.5, 53, 54, 55–57
See application file for complete search history.

(56) References Cited

U.S. PATENT DOCUMENTS

| | | | | |
|---|---|---|---|---|
| 187,016 A * | 2/1877 | Johnston | | 43/125 |
| 378,509 A * | 2/1888 | Kibler | | 43/131 |
| 478,691 A * | 7/1892 | De Shon | | 43/131 |
| 495,091 A * | 4/1893 | Jenisch | | 43/131 |
| 882,142 A * | 3/1908 | Cruan | | 43/131 |
| 984,352 A * | 2/1911 | Costello | | 239/57 |
| 1,056,535 A * | 3/1913 | Grimes | | 43/131 |
| 1,631,121 A * | 6/1927 | Eckl | | 43/131 |
| 1,769,409 A * | 7/1930 | Armstrong | | 239/57 |
| 1,780,407 A * | 11/1930 | Smith | | 239/55 |
| 1,780,408 A * | 11/1930 | Smith | | 239/55 |
| 1,898,621 A * | 2/1933 | Ferguson | | 239/57 |
| 1,902,723 A * | 3/1933 | Roberts | | 43/131 |
| 1,916,982 A * | 7/1933 | Jones | | 43/131 |
| 1,980,754 A * | 11/1934 | Henning et al. | | 43/132.1 |
| 1,991,938 A * | 2/1935 | Houghton | | 43/129 |
| 2,086,046 A * | 7/1937 | Preston | | 43/131 |
| 2,147,384 A * | 2/1939 | Salfisberg | | 43/131 |
| 2,219,403 A * | 10/1940 | Sennewald | | 43/131 |
| 2,383,960 A * | 9/1945 | Dupuy | | 239/51.5 |
| 2,418,878 A * | 4/1947 | Harkins | | 239/57 |
| 2,500,896 A * | 3/1950 | Drake | | 239/51.5 |
| 2,545,160 A * | 3/1951 | Miller | | 239/55 |
| 2,547,687 A * | 4/1951 | Brody | | 239/57 |
| 2,547,688 A * | 4/1951 | Brody | | 239/57 |
| 2,550,954 A * | 5/1951 | Benedict | | 239/57 |

(Continued)

FOREIGN PATENT DOCUMENTS

DE    2264312 A  *  7/1974

(Continued)

OTHER PUBLICATIONS

Massey University website article "Insight into Tom Cat Smell", http://masseynews.massey.ac.nz/2002/masseynews/feb/feb_4/stories/tom_cat.html.

(Continued)

*Primary Examiner*—Darren W Ark
(74) *Attorney, Agent, or Firm*—Fish & Richardson P.C.

(57) ABSTRACT

A rodent repellent device has a housing substantially enclosing a porous storage medium in an interior region of the housing; and a repellent disposed within the storage medium, the repellent including a component of feline urine that disperses into atmospheric air at room temperature.

7 Claims, 5 Drawing Sheets

U.S. PATENT DOCUMENTS

| | | | |
|---|---|---|---|
| 2,564,860 A * | 8/1951 | Ryberg | 239/55 |
| 2,606,065 A * | 8/1952 | Logan et al. | 239/57 |
| 2,629,628 A * | 2/1953 | Vaillancourt | 239/57 |
| 2,657,090 A * | 10/1953 | Meek | 239/55 |
| 2,690,030 A * | 9/1954 | Pierce | 239/57 |
| 2,717,174 A * | 9/1955 | Casanovas | 239/56 |
| 2,734,769 A * | 2/1956 | Hotz | 239/57 |
| 2,755,954 A * | 7/1956 | Antritter | 239/57 |
| 2,836,462 A * | 5/1958 | Wenner | 239/57 |
| 2,850,321 A * | 9/1958 | Hoffman | 239/56 |
| 2,959,354 A * | 11/1960 | Beck | 239/55 |
| 2,979,268 A * | 4/1961 | Brun | 239/55 |
| 2,999,642 A * | 9/1961 | Stone | 239/55 |
| 3,065,915 A * | 11/1962 | Samann | 239/56 |
| 3,088,241 A * | 5/1963 | Shrojavacca | 43/132.1 |
| 3,129,888 A * | 4/1964 | O'Hagan | 239/57 |
| 3,169,705 A * | 2/1965 | Geiger | 239/34 |
| 3,221,438 A * | 12/1965 | Huyssen | 43/124 |
| 3,324,590 A * | 6/1967 | Richardson | 43/131 |
| 3,405,688 A * | 10/1968 | Gerhardi | 43/131 |
| 3,515,302 A * | 6/1970 | Curran | 239/57 |
| 3,527,405 A * | 9/1970 | Harding | 239/51.5 |
| 3,659,373 A * | 5/1972 | Daeninckx | 43/125 |
| 3,702,677 A * | 11/1972 | Heffington | 239/55 |
| 3,704,539 A * | 12/1972 | Alvarez | 43/131 |
| 3,706,140 A * | 12/1972 | Brillaud et al. | 239/55 |
| 3,717,303 A * | 2/1973 | Daeninckx et al. | 239/57 |
| 3,727,840 A * | 4/1973 | Nigro | 239/57 |
| 3,807,082 A * | 4/1974 | Hautmann et al. | 43/125 |
| 3,826,036 A * | 7/1974 | Neugebauer | 43/131 |
| 3,837,574 A * | 9/1974 | Curran | 239/57 |
| 3,864,867 A * | 2/1975 | Dry | 43/131 |
| 3,896,995 A * | 7/1975 | Lelicoff | 239/56 |
| 4,158,440 A * | 6/1979 | Sullivan et al. | 239/56 |
| 4,161,284 A * | 7/1979 | Rattan | 239/56 |
| 4,247,042 A * | 1/1981 | Schimanski et al. | 239/47 |
| 4,258,004 A * | 3/1981 | Valenzona et al. | 239/57 |
| 4,277,024 A * | 7/1981 | Spector | 239/56 |
| 4,293,095 A * | 10/1981 | Hamilton et al. | 239/47 |
| 4,323,193 A * | 4/1982 | Compton et al. | 239/44 |
| 4,345,716 A * | 8/1982 | Armstrong et al. | 239/56 |
| 4,361,279 A * | 11/1982 | Beacham | 239/56 |
| 4,374,571 A * | 2/1983 | Hirvela | 239/36 |
| 4,414,653 A * | 11/1983 | Pettinger | 367/139 |
| 4,502,630 A * | 3/1985 | Haworth et al. | 239/34 |
| 4,505,429 A * | 3/1985 | Mandon | 239/56 |
| 4,526,320 A * | 7/1985 | von Philipp et al. | 239/57 |
| 4,549,693 A * | 10/1985 | Barlics | 239/56 |
| 4,552,307 A * | 11/1985 | Stedham | 239/57 |
| 4,558,820 A * | 12/1985 | Harris, Jr. | 239/56 |
| 4,572,375 A * | 2/1986 | Baer | 239/56 |
| 4,583,686 A * | 4/1986 | Martens et al. | 239/51.5 |
| 4,630,775 A * | 12/1986 | Mandon et al. | 239/56 |
| 4,657,759 A * | 4/1987 | Hansen et al. | 514/169 |
| 4,660,763 A * | 4/1987 | Gutkowski et al. | 239/56 |
| 4,660,764 A * | 4/1987 | Joyaux et al. | 239/47 |
| 4,804,142 A * | 2/1989 | Riley | 239/56 |
| 4,807,391 A * | 2/1989 | Bokiau | 43/131 |
| 4,815,659 A * | 3/1989 | Turko et al. | 239/55 |
| 4,818,535 A * | 4/1989 | Baines et al. | 424/407 |
| 4,839,144 A * | 6/1989 | Martin | 239/57 |
| 5,033,229 A * | 7/1991 | Demarest et al. | 43/124 |
| 5,119,586 A * | 6/1992 | Townsend | 43/131 |
| 5,164,178 A * | 11/1992 | Muysson | 239/53 |
| 5,180,107 A * | 1/1993 | Lindauer | 239/55 |
| 5,242,111 A * | 9/1993 | Nakoneczny et al. | 239/55 |
| 5,252,326 A * | 10/1993 | Novotny et al. | 424/54 |
| D344,319 S * | 2/1994 | Liu | D22/120 |
| 5,297,732 A * | 3/1994 | Hahn | 239/55 |
| 5,372,303 A * | 12/1994 | Paul | 239/56 |
| 5,379,545 A * | 1/1995 | Gall et al. | 239/57 |
| 5,397,033 A * | 3/1995 | Blomquist | 43/131 |
| D370,247 S * | 5/1996 | Shammas | D22/120 |
| 5,518,790 A * | 5/1996 | Huber et al. | 239/57 |
| 5,548,922 A * | 8/1996 | Wefler | 43/131 |
| 5,575,992 A * | 11/1996 | Kunze | 239/34 |
| 5,611,165 A * | 3/1997 | Blaha | 239/58 |
| 5,737,870 A * | 4/1998 | Thind | 43/132.1 |
| 5,746,019 A * | 5/1998 | Fisher | 239/47 |
| 5,782,409 A * | 7/1998 | Paul | 239/56 |
| 5,840,246 A * | 11/1998 | Hammons et al. | 239/55 |
| 5,857,620 A * | 1/1999 | Nakoneczny | 239/47 |
| 5,904,028 A * | 5/1999 | Fujiura et al. | 239/56 |
| 5,918,537 A * | 7/1999 | Forsythe et al. | 239/34 |
| 5,943,816 A * | 8/1999 | Hyatt et al. | 239/57 |
| 5,945,094 A * | 8/1999 | Martin et al. | 239/44 |
| 5,967,412 A * | 10/1999 | Lee | 239/57 |
| 6,014,834 A * | 1/2000 | Ferland | 43/131 |
| 6,024,386 A * | 2/2000 | Spector | 239/57 |
| 6,338,296 B1 * | 1/2002 | Forsythe et al. | 239/34 |
| 6,398,127 B1 * | 6/2002 | Wingo | 239/57 |
| 6,435,423 B2 * | 8/2002 | Hurry et al. | 239/34 |
| 6,475,504 B1 * | 11/2002 | Stewart | 424/406 |
| 6,557,778 B1 * | 5/2003 | Shiffler | 239/56 |
| 6,625,922 B1 * | 9/2003 | Ernsberger, IV | 43/107 |
| 6,631,852 B1 * | 10/2003 | O'Leary | 239/57 |
| 6,652,870 B2 * | 11/2003 | Campbell et al. | 424/406 |
| 6,705,541 B2 * | 3/2004 | Schuehrer et al. | 239/57 |
| 6,746,521 B2 * | 6/2004 | Canfield | 239/57 |
| 6,746,750 B1 * | 6/2004 | Bishopp | 239/34 |
| 6,857,579 B2 * | 2/2005 | Harris | 239/57 |
| 6,938,832 B2 * | 9/2005 | Sada | 239/56 |
| 6,953,814 B2 * | 10/2005 | Reifenrath | 514/558 |
| 7,048,203 B2 * | 5/2006 | Harada et al. | 239/56 |
| 7,093,389 B1 * | 8/2006 | Meier et al. | 43/132.1 |
| 7,093,772 B2 * | 8/2006 | Griese et al. | 239/43 |
| 7,147,171 B2 * | 12/2006 | Harada et al. | 239/57 |
| 7,204,054 B2 * | 4/2007 | Mayo et al. | 43/131 |
| 7,213,770 B2 * | 5/2007 | Martens et al. | 239/57 |
| 2001/0006668 A1 * | 7/2001 | Brown | 424/405 |
| 2001/0030243 A1 * | 10/2001 | Hurry et al. | 239/34 |
| 2002/0066798 A1 * | 6/2002 | Laudamiel-Pellet et al. | 239/44 |
| 2003/0085298 A1 * | 5/2003 | Schuehrer et al. | 239/34 |
| 2004/0003530 A1 * | 1/2004 | Younker | 43/1 |
| 2005/0089543 A1 * | 4/2005 | Weiser | 424/410 |
| 2005/0147523 A1 * | 7/2005 | Laudamiel-Pellet et al. | 239/57 |
| 2005/0150973 A1 * | 7/2005 | Brown et al. | 239/57 |
| 2006/0064925 A1 * | 3/2006 | Morgan | 43/125 |
| 2006/0081721 A1 * | 4/2006 | Caserta et al. | 239/44 |
| 2006/0196100 A1 * | 9/2006 | Laudamiel-Pellet et al. | 43/1 |
| 2006/0237554 A1 * | 10/2006 | Colarusso | 239/51.5 |
| 2006/0263326 A1 * | 11/2006 | Weiser | 424/74 |
| 2007/0057086 A1 * | 3/2007 | Van Kippersluis | 239/34 |

FOREIGN PATENT DOCUMENTS

| | | | |
|---|---|---|---|
| JP | 60126202 A * | 7/1985 | |
| JP | 2004-189684 A * | 7/2004 | |

OTHER PUBLICATIONS

Leg Up Enterprises, "100% Predator Urine", http://www.legupenterprises.com.

* cited by examiner

REPELLING RODENTS

TECHNICAL FIELD

This invention relates to rodent repellent devices, and more particularly to scent-based rodent repellent devices.

BACKGROUND

The unwanted presence of rats, mice, and other rodents is an ongoing problem in many environments such as residential settings, waste disposal structures, and food processing facilities. Rodents can create unpleasant odors, damage stored furniture and clothing, contaminate food, and carry disease. Consequently, a number of approaches have been used or proposed to end and/or prevent rodent problems.

Poisons and traps have been used as means of rodent control. Poisons are placed where they will be ingested by invading rodents. Poisons are inappropriate for use in food preparation and storage areas and, more generally, storage and use locations must be carefully chosen to ensure that poisons are not accessible to pets or children. Users must find poisoned rodents, if they travel away from the poison site before dying, and dispose of their bodies. Traps tend to be less dangerous than poisons but still must be placed away from children and pets. By their nature, traps typically prevent rodents from leaving the trap site and users must dispose of the trapped rodents.

Sonic- and scent-based repellents have also been used as means of preventing rodent infestations. Sonic repellents include devices that generate sound waves at frequencies offensive to rats and mice. These devices are typically electrically powered. Some scent-based repellents use predator urine from species including coyote, fox, bobcat, wolf, and mountain lion to deter prey animals from entering a specific area. Users can fill dispensers with predator urine and place them around the perimeter of the specific area, for example.

SUMMARY

In an aspect of the invention, a rodent repellent device has a housing substantially enclosing a porous storage medium in an interior region of the housing; and a repellent disposed within the storage medium, the repellent including a component of feline urine that disperses into atmospheric air at room temperature.

The phrase "disperses into atmospheric air at room temperature" indicates that the repellent disperses into the air outside the device at least at temperatures in the range of about 68 to about 77 degrees Fahrenheit. This does not exclude repellents that disperse into the air at temperatures outside this range such as for use both indoors and outdoors.

In another aspect of the invention, a rodent repellent device has a housing substantially enclosing an interior region; a repellent disposed within the interior region, the repellent comprising a component of feline urine that disperses into atmospheric air at room temperature; an initial release seal restricting hydraulic communication between the interior region and the air; and an operating repellent release seal restricting hydraulic communication between the interior region and the air. This aspect of the invention may feature a storage medium substantially enclosed by the housing, the repellent disposed within the storage medium. In embodiments featuring the storage medium, the storage medium preferably comprises a multiplicity of cotton fibers.

In another aspect of the invention, a method of repelling rodents comprises: providing a rodent repellent device, the rodent repellent device comprising a housing substantially enclosing a porous storage medium in an interior region of the housing; and a repellent disposed within the storage medium, the repellent comprising a component of feline urine that disperses into atmospheric air at room temperature; mounting the device to a structure; and exposing the component of feline urine to atmospheric air. In this aspect of the invention, mounting the device to a structure may comprise attaching an adhesive disposed on an outside surface of the housing to a mounting surface of the structure. Dispersing the component may comprise rotating the lid from a closed position, in which the lid and the base engage to form a seal restricting hydraulic communication between the interior region of the housing and the air, to an open position in which the lid and the base define passages enabling hydraulic communication between the interior region and the air. Alternatively, dispersing the component may comprise lifting a releasable cover to expose holes defined in the lid, the holes extending between the interior region of the housing and the air, or may comprise pulling a tab to tear a frangible membrane sealing the porous storage medium within the interior region, the tab extending from the frangible membrane and exposed outside the housing. Preferably, the structure is a house. More preferably, mounting the device to the house comprises attaching the device a vertical structure within the house near an access point used by rodents to enter the house.

Any of these aspects may include one or more of the following features. In some embodiments, the component of feline urine comprises felinine. The rodent repellent device preferably contains no more than a teaspoon of the repellent. The rodent repellent device preferably also contains a scented compound selected to at least partially mask the odor of the feline urine component from human detection. The storage medium can comprise a multiplicity of cotton fibers. The rodent repellent device preferably also has an adhesive disposed on an outside surface of the housing and arranged to secure the device to a mounting surface. The rodent repellent device may be contained within a sealed package configured for retail sale.

The housing may be operable to expose the repellent to air circulation. Preferably, the housing comprises a base supporting a lid. In some embodiments, the lid is attached to the base and is rotatable between: a closed position in which the lid and the base engage to form a seal restricting hydraulic communication between the interior region of the housing and the air; and an open position in which the lid and the base define passages enabling hydraulic communication between the interior region and the air. In other embodiments, the lid defines holes extending between the interior region of the housing and the air. In these embodiments, the rodent repellent device preferably also has a removable cover extending across the holes and restricting hydraulic communication between the interior region and the air.

The rodent repellent device can also include a frangible membrane sealing the porous storage medium within the interior region of the housing; and a tab extending from the frangible membrane and exposed to be pulled to tear the membrane to expose the repellent. Preferably, the frangible membrane is a portion of a plastic bag and the tab is a flexible strip extending from the plastic bag beyond the housing.

In embodiments with release seals, the initial release seal may comprise a frangible membrane substantially disposed within the housing, the frangible membrane sealing the repellent within the interior region. Preferably, a tab extends from the frangible membrane and is exposed to be pulled to tear the membrane to expose the repellent. Alternatively, the initial release seal may comprise a package enclosing the housing.

The operating repellent release seal may be formed by the engagement of the base and the lid. Preferably, the lid is attached to the base and is rotatable between a closed position, in which the lid and the base engage and restrict hydraulic communication between the interior region of the housing and the air, and an open position in which the lid and the base define passages enabling hydraulic communication between the interior region and the air.

The rodent repellent devices and methods described above can provide a user-friendly means of dealing with the problem posed by the unwanted presence of rodents in or near a room or structure. As repellents, these devices can deter rodents from entering the room or structure or can drive them away if they are already present. Because the rodents are not captured or killed, users do not need to dispose of the rodents or their bodies. The described devices and methods also avoid the need for users to directly handle repellents such as animal urine while allowing for a controlled release of the repellents. They can be cleanly and easily used in a wide range of environments and may be conveniently and unobtrusively located near areas where rodents are believed to undesirably access a room or structure. Various illustrated examples have housings that are constructed to permit ready and prolonged dispersion of sufficient scent, while providing a suitable and attractive enclosure that can be semi-permanently mounted, such as by adhesive, to a suitable mounting surface at any orientation without spilling.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
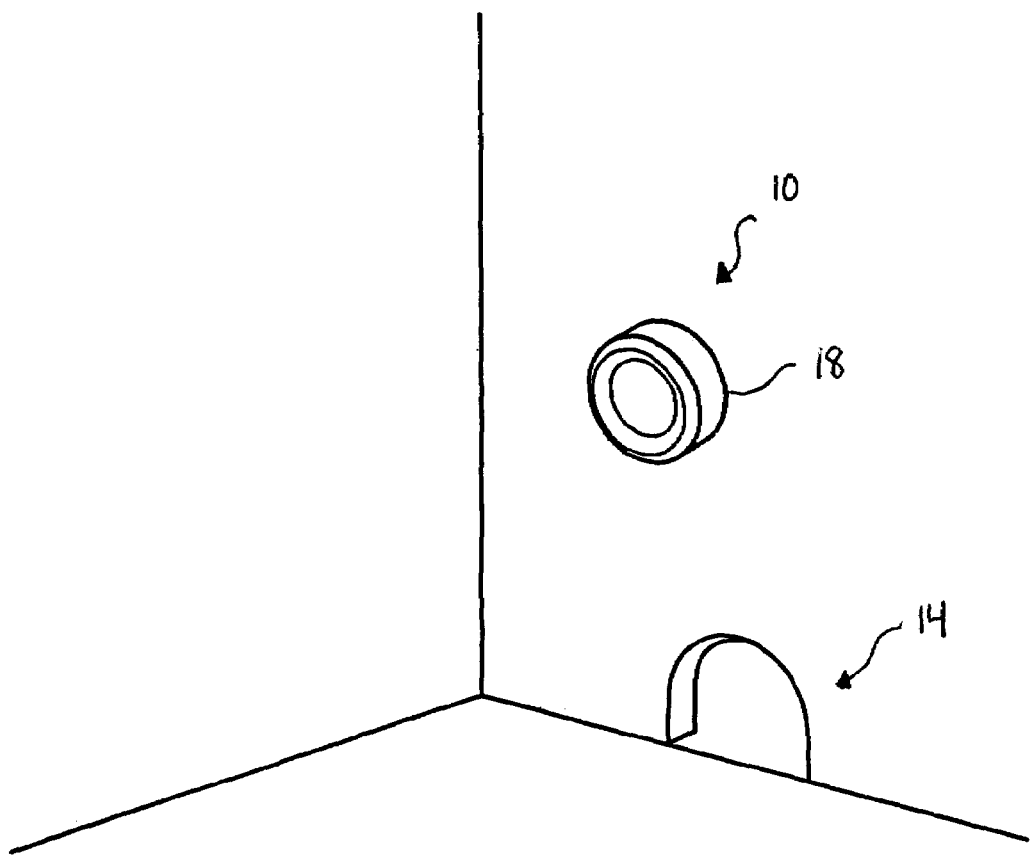
FIG. 1 is a view of a rodent repellent device in use.

Referring to FIG. 1, a rodent repellent device 10 is mounted on a wall above a mouse hole 14. As a user-friendly way of repelling rodents such as mice, rats, and squirrels, the rodent repellent device 10 provides a way of deterring rodent infestations while avoiding the need to dispose of live or dead rodents associated with traps and poisons. The rodent repellent device 10 has a housing 18 containing a repellent that comprises a component of feline urine that disperses into atmospheric air at room temperature. Feline urine is commercially available from LegUp Enterprises Inc. (Lovell, Me.) from species including bobcats and mountain lions.

Figure 2A:
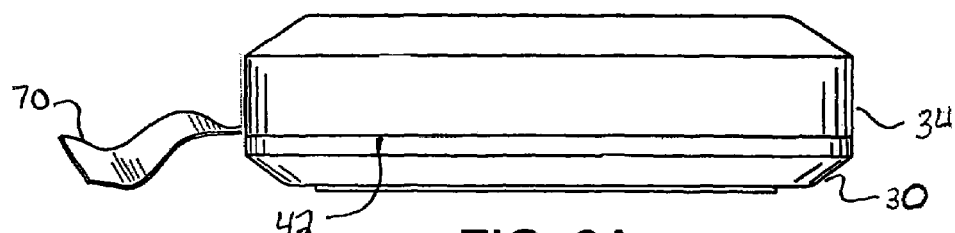
FIGS. 2A, 2B, and 2C are, respectively, side views in closed and open configurations and an exploded perspective view of the rodent repellent device of FIG. 1.
Figure 2B:
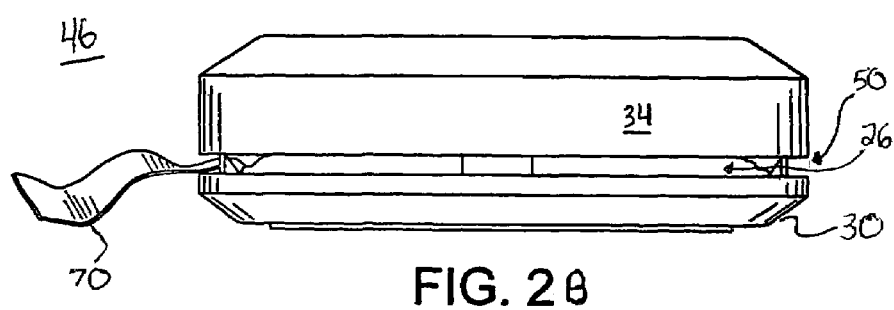
Figure 2C:
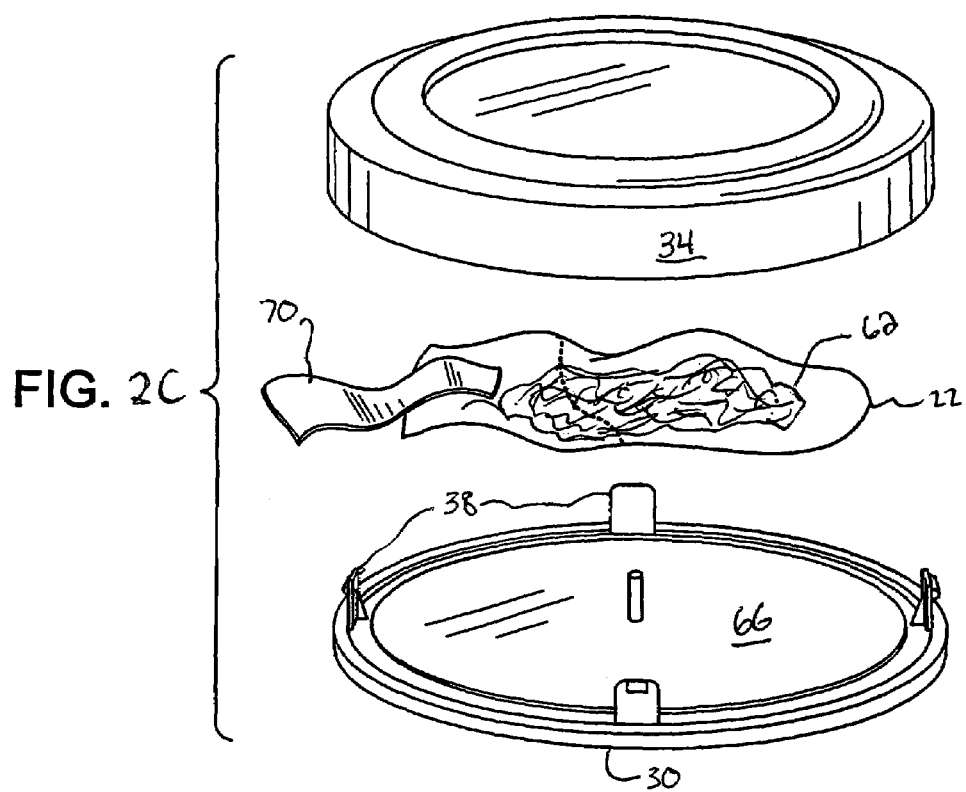

Referring to FIGS. 2A, 2B, and 2C, the housing 18 of the rodent repellent substantially encloses a frangible plastic bag 22 in an interior region 26 of the housing. The housing 18 has a base 30 supporting a lid 34. The lid 34 defines internal threading (not shown) that engages projections 38 so that rotation of the lid 34 relative to the base 30 moves the device from a closed configuration to an open configuration. When the lid 34 is in an closed position, the lid and the base engage to form a seal 42 restricting hydraulic communication between the interior region 26 of the housing and the air 46 surrounding the device 10 (see FIG. 2A). Rotation of the lid to its open position opens passages 50 between the lid 34 and the base 30 that enable hydraulic communication between the interior region 26 and the surrounding air 46 (see FIG. 2B). Rotation of the lid 34 back to its closed position reseals that device 10 and limits further dispersal of the repellent. The housing 18 is preferably formed of a lightweight material that is resistant to penetration by liquids or gases. The housing can be manufactured in a variety of ways from a variety of materials including, for example, molded from plastic.

Figure 3:
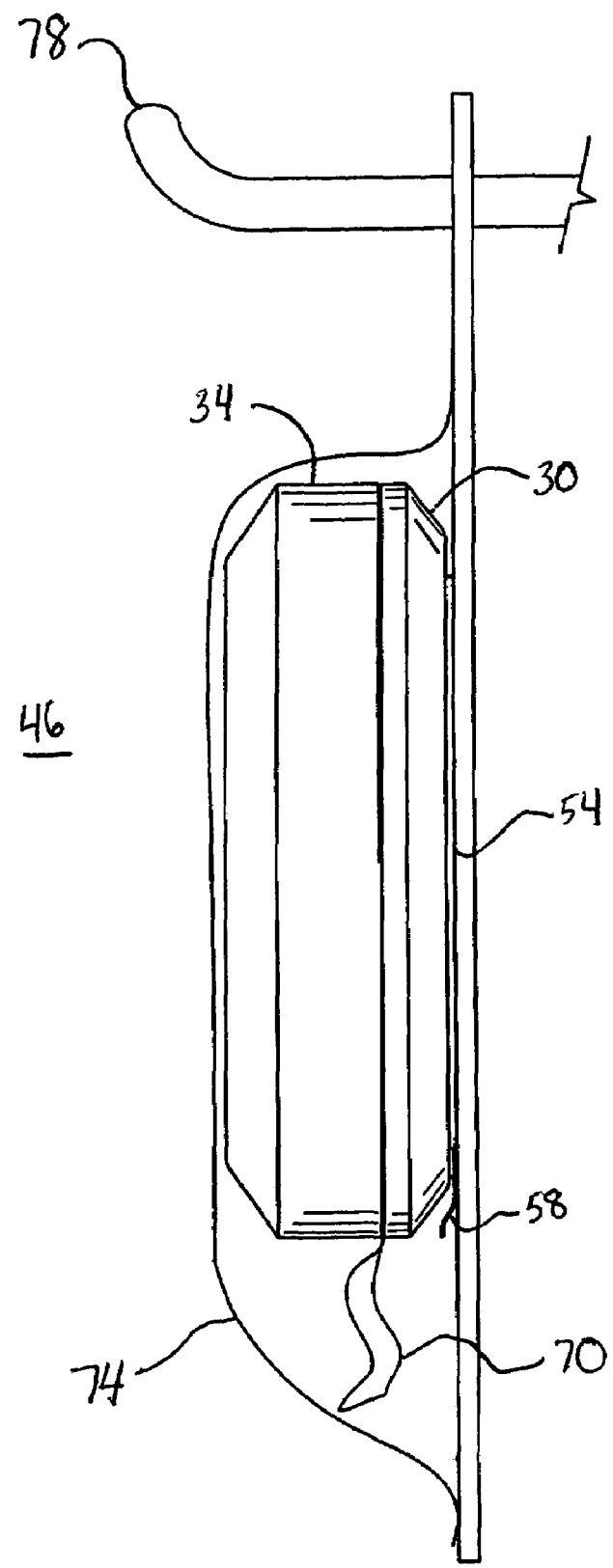
FIG. 3 is a side view of a rodent repellent device packaged for retail sale.

The rodent repellent device 10 also has an adhesive 54 on an outer surface of the base 30 (see FIG. 3). The adhesive 54 is covered with release paper 58 and is arranged to secure the device to a mounting surface.

The frangible plastic bag contains a cotton ball 62 and approximately a quarter teaspoon ounces of bobcat urine. This amount of bobcat urine is believed to provide some deterrent effect to mice for at least 30 days. Although the amount of repellent can clearly be varied, it is currently preferred that the device contain less than about a teaspoon of repellent in order to reduce the extent that the repellent will be noticeable and objectionable to humans. The device also has a pad 66 containing a scented compound selected to at least partially mask odor of the repellent from human detection.

A flexible tab 70 extends from the frangible plastic bag 22 out of the housing 18. The tab 70 is exposed to be pulled to tear the membrane to expose the repellent. The tab is preferably a thin material so that it can extend between the lid 34 and the base 30 without significantly interfering with the seal 42 formed by the engagement between the two. However, the tab 70 should also be durable enough to resist abrasion and/or tearing when it is interposed between the engaged lid 34 and base 30. Appropriate materials for the tab include, for example, foil, urethane, and thermoplastics.

Referring to FIG. 3, the device 10 is prepared for retail sale in a sealed package 74. The package 74 acts to further limit dispersal of any repellent that should escape the device 10 in spite of its initial closed configuration. The package 74 is prepared with printed text and pictures describing the device 10 and defines a hole configured to receive a shelving rod 78. Other means of distributing the device 10 include, for example, bulk shipment of multiple devices to be used in an industrial facility.

In response to a rodent problem, a user would purchase the device 10 and remove it from its package 74. The device 10 is initially in its closed configuration with the tab 70 extending between the lid 34 and base 30. The user removes the release paper 58 from the adhesive 54 and, preferably, mounts the device 10 on a vertical structure near an area where rodents are believed to undesirably access a room or structure. The user rotates the lid 34 from its closed position to its open position thus enabling hydraulic communication between the interior region 26 and the air 46. The user then grasps the tab 70 and pulls it to tear the frangible plastic bag 22 and release the repellent. The seals formed by the package 74 and the frangible plastic bag 22 provide initial release seals and are not configured to be closed after their initial use. In contrast, the seal 42 between the lid 34 and base 30 can be reformed by rotating the lid 34 back to its closed position. This extends the life of the device 10 by allowing for periods of intermittent use interposed with rest periods during which the remaining repellent is conserved within the device. It also allows users to keep the level of repellent dispersed to atmospheric air below levels objectionable to humans.

Figure 4A:
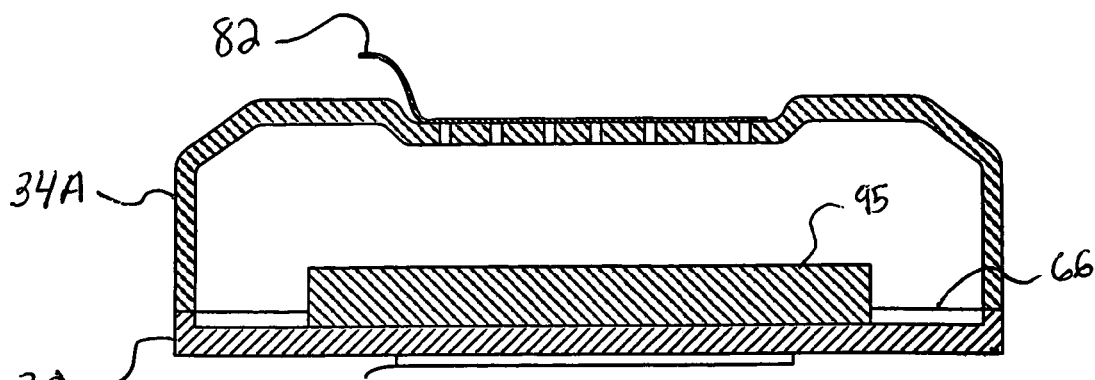
FIG. 4A is a cross-section of a rodent repellent device with a flexible tab covering air holes.
Figure 4B:
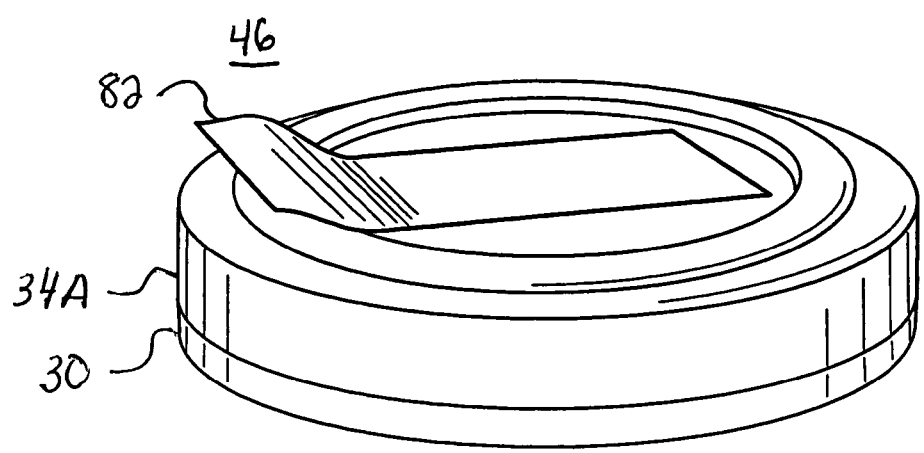
FIGS. 4B and 4C are perspective views of the rodent repellent device of claim 4A with the flexible tab, respectively, secured and released.
Figure 4C:
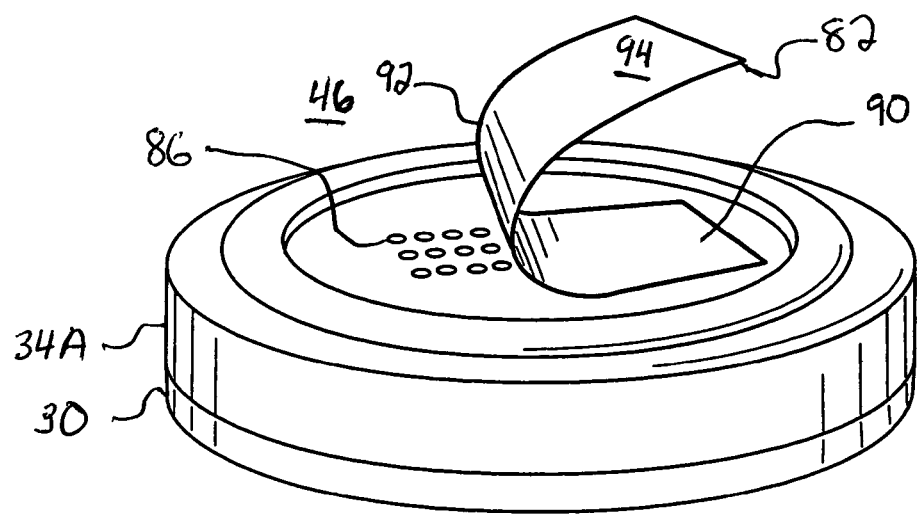

Referring to FIGS. 4A, 4B, and 4C, a rodent repellent device 10a similarly constructed of a lid 34 secured to a base 30 uses holes defined in the lid 34 to disperse the repellent. A removable cover 82 extends across the holes 86 and restricts hydraulic communication between the interior region 26 and the air 46. The cover 82 has a fixed end 90 persistently attached to lid, an sealing portion 92 covering the holes 86, and a grip end 94. The sealing portion has a reusable adhesive on the side facing the lid. Alternatively, rather than adhesive, the sealing portion can include projections configured to engage and substantially seal the holes 86. A sponge-like porous pad 95 contains the repellent and a second pad 66 contains a masking scented compound.

Figure 5A:
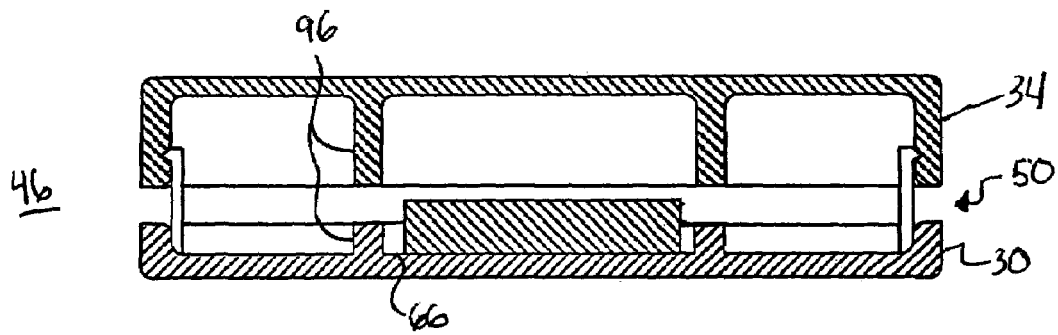
FIGS. 5A and 5B are cross-section views of a rodent repellent device with an interior chamber.
Figure 5B:
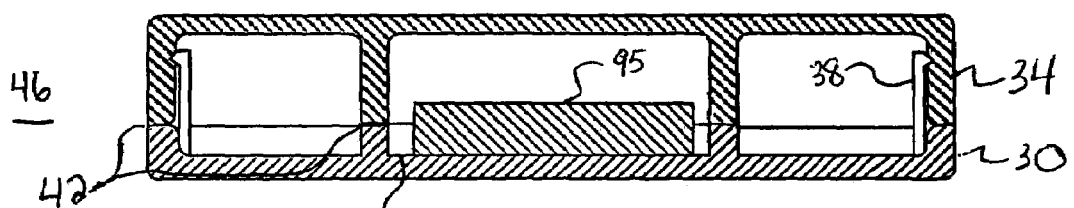
Figure 5C:
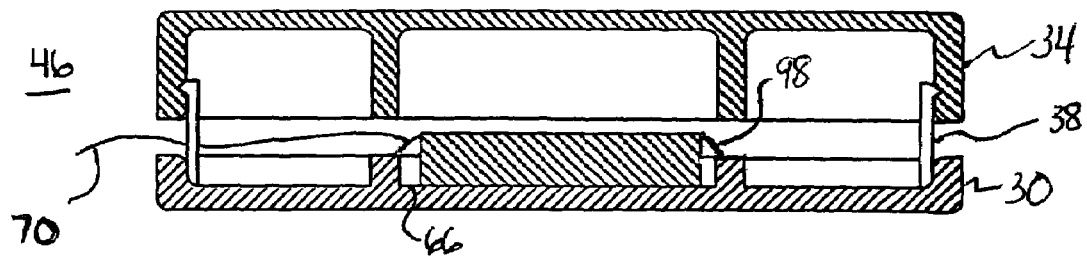
FIG. 5C is a side view of the rodent repellent device of FIGS. 5A and 5B with an alternate interior seal.

Referring to FIGS. 5A and 5B, a rodent repellent device 10b is constructed with the lid 34 and base 30 each having matching interior walls 96. The interior walls 96 engage to form an interior seal 42 when the lid 34 is rotated to its closed position. A sponge-like porous pad 95 contains the repellent and a second pad 66 contains a masking scented compound. With two seals 42, the device 10 provides additional containment of the repellent when the lid 34 is rotated back to its closed position. In this embodiment, external packaging as shown in FIG. 3, if used, provides the only initial release seal. However, as shown in FIG. 5C, an initial release seal can be provided by enclosing the pads 66, 95 with a frangible membrane 98 that extends between portions of the interior wall 96 of the base 30 and across the pads 66, 95. A flexible tab 70 extends from the frangible membrane 98 out of the housing 18. The tab 70 is exposed to be pulled to tear the membrane to expose the repellent.

Typically, a user will mount rodent repellent devices such as those discussed above on a structure and expose the component of feline urine to atmospheric air. Many of the structural features of these devices are chosen to be compatible with use inside a house. However, these features are also compatible with use both inside and outside other structures including, for example, manufacturing facilities, food processing plants, and dumpsters. Mounting the device to a structure will typically comprise attaching an adhesive disposed on an outside surface of the housing to a mounting surface of the structure. When used in a dwelling, the devices will preferably be attached to a vertical structure within the house near an access point used by rodents to enter the house. This approach attempts to deter rodents from entering the house rather than dealing with them after they enter. As discussed above, this avoids the need, associated with traps and poisons, to dispose of live or dead rodents.

A number of embodiments of the invention have been described. Nevertheless, it will be understood that various modifications may be made without departing from the spirit and scope of the invention. For example, sponges, non-cotton fabrics, or porous pellets could be used rather than cotton balls and porous pads as repellent storage media. Accordingly, other embodiments are within the scope of the following claims.

What is claimed is:

1. A rodent repellent device comprising:
   a housing comprising a base supporting a lid, the housing substantially enclosing a porous storage medium in an interior region of the housing;
   a repellent disposed within the storage medium, the repellent comprising a component of feline urine that disperses into atmospheric air at room temperature;
   a frangible membrane sealing the porous storage medium within the interior region of the housing; and
   a tab extending from the frangible membrane and exposed to be pulled to tear the frangible membrane to expose the repellent;
   wherein the housing is operable to expose the repellent to air circulation;
   wherein the lid is attached to the base and is rotatable between:
     a closed position in which the lid and the base engage to form a seal restricting hydraulic communication between the interior region of the housing and the air; and
     an open position in which the lid and the base define passages enabling hydraulic communication between the interior region and the air;
   wherein the frangible membrane is a portion of a plastic bag and the tab is a flexible strip extending from the plastic bag, between the lid and base, and beyond and outside the housing.

2. The rodent repellent device of claim 1 wherein the component of feline urine comprises felinine.

3. The rodent repellent device of claim 1 comprising no more than one teaspoon of the repellent.

4. The rodent repellent device of claim 1 further comprising a scented compound selected to at least partially mask odor of the feline urine component from human detection.

5. The rodent repellent device of claim 1 wherein the storage medium comprises a multiplicity of cotton fibers.

6. The rodent repellent device of claim 1 further comprising an adhesive disposed on an outside surface of the housing and arranged to secure the device to a mounting surface.

7. The rodent repellent device of claim 1 contained within a sealed package configured for retail sale.

* * * * *